United States Patent
Kadam et al.

(10) Patent No.: US 11,752,872 B2
(45) Date of Patent: Sep. 12, 2023

(54) INTERIOR VEHICLE COMPONENT

(71) Applicant: Ford Global Technologies, LLC, Dearborn, MI (US)

(72) Inventors: Mangesh Kadam, Canton, MI (US); Srinivas Reddy Malapati, Novi, MI (US); Eric D. Veggian, Superior Township, MI (US); Keith Trudgeon, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 821 days.

(21) Appl. No.: 16/434,965

(22) Filed: Jun. 7, 2019

(65) Prior Publication Data

US 2020/0384861 A1 Dec. 10, 2020

(51) Int. Cl.
| | | |
|---|---|---|
| *B60K 37/02* | (2006.01) | |
| *B60K 37/04* | (2006.01) | |
| *B60R 21/205* | (2011.01) | |
| *B60R 11/00* | (2006.01) | |

(52) U.S. Cl.
CPC .............. *B60K 37/02* (2013.01); *B60K 37/04* (2013.01); *B60R 21/205* (2013.01); *B60K 2370/152* (2019.05); *B60K 2370/63* (2019.05); *B60K 2370/67* (2019.05); *B60K 2370/682* (2019.05); *B60K 2370/744* (2019.05); *B60R 2011/0005* (2013.01)

(58) Field of Classification Search
CPC .. B60K 37/02; B60K 37/04; B60K 2370/152; B60K 2370/682; B60K 2370/744; B60K 2370/67; B60K 2370/63; B60K 2370/1523; B60K 35/00; B60K 37/00; B60R 21/205; B60R 2011/0005; B60R 2011/0085; B60R 11/0235; B60R 21/02; B60R 2021/0273
See application file for complete search history.

(56) References Cited

U.S. PATENT DOCUMENTS

| | | | |
|---|---|---|---|
| 6,435,554 B1* | 8/2002 | Feldman | B60R 21/231 280/743.2 |
| 9,682,662 B2 | 6/2017 | Vinton | |
| 2003/0128103 A1* | 7/2003 | Fitzpatrick | B60K 35/00 345/1.3 |
| 2006/0164230 A1* | 7/2006 | DeWind | B60K 37/06 340/461 |
| 2009/0038352 A1* | 2/2009 | Yamaguchi | E05B 83/30 70/237 |
| 2016/0159292 A1* | 6/2016 | Wall | B60R 13/0256 296/37.12 |
| 2017/0098425 A1 | 4/2017 | Takamatsu et al. | |
| 2019/0077357 A1* | 3/2019 | Rupp | B60R 21/233 |

FOREIGN PATENT DOCUMENTS

| | | | |
|---|---|---|---|
| DE | 102004040409 A1 | 3/2006 | |
| EP | 2574491 A1 * | 4/2013 | ............ B60K 35/00 |
| EP | 2676847 B1 | 1/2016 | |
| FR | 3006962 A1 | 12/2014 | |
| JP | 2006306234 A | 11/2006 | |
| JP | 2007038851 A | 2/2007 | |
| JP | 2009050522 A | 3/2009 | |

* cited by examiner

*Primary Examiner* — Douglas M Wilson
(74) *Attorney, Agent, or Firm* — Frank A. MacKenzie; Bejin Bieneman PLC

(57) ABSTRACT

An assembly includes an instrument panel and a base rotatably mounted to the instrument panel between a front position and a stowed position. An interior component is supported by the base. A spring biases the base toward the stowed position.

13 Claims, 6 Drawing Sheets

INTERIOR VEHICLE COMPONENT

BACKGROUND

Vehicles may include display screens to provide messages and information to vehicle occupants. The display screens may be integrated into a center stack or mounted to an instrument panel. The display screens may be human-machine interface (HMI) displays that provide information to occupants and receive occupant input. For example, the display screen may receive input for an entertainment subsystem.

DETAILED DESCRIPTION

Figure 1:
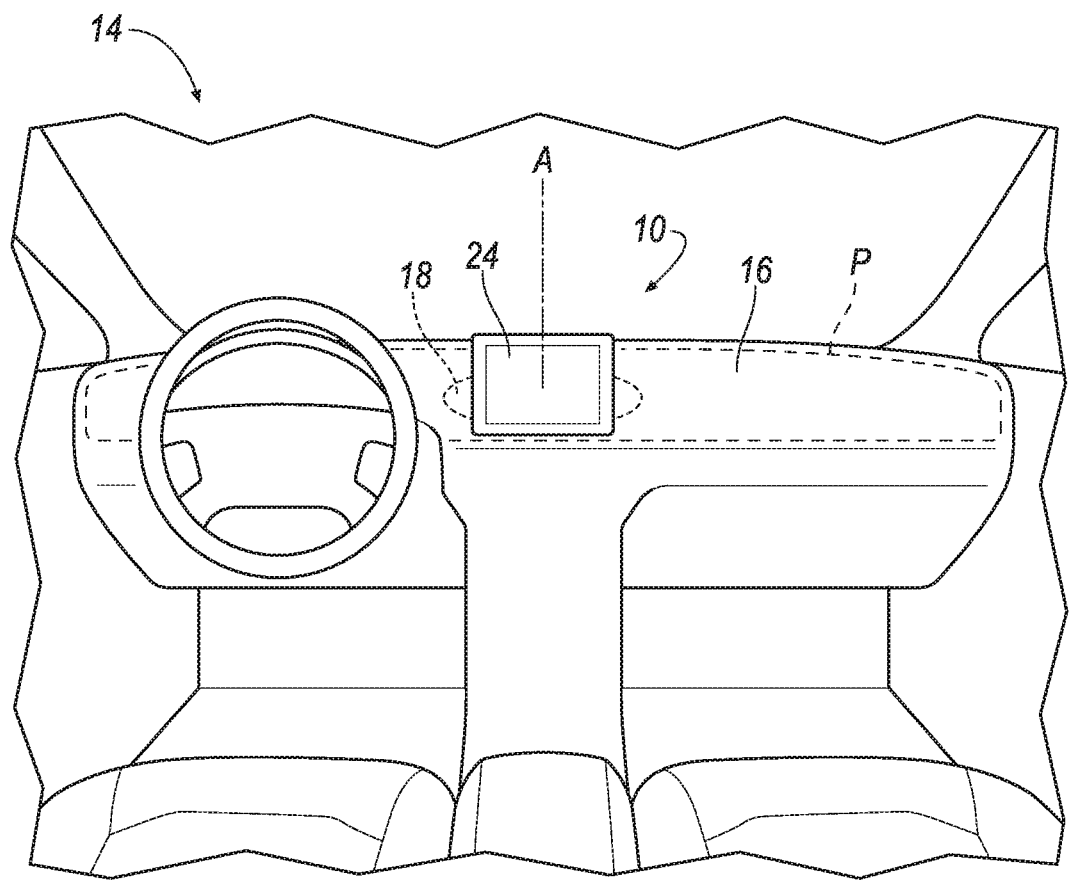
FIG. 1 is a front view of an instrument panel and an interior component that is a display.

An assembly includes an instrument panel, a base rotatably mounted to the instrument panel between a front position and a stowed position. A spring biases the base toward the stowed position. An interior component is supported by the base.

The interior component may be a display screen.

The assembly may further include a connector releasably engaged with the instrument panel and the base in the front position against the bias of the spring.

The assembly may further include an actuator operatively connected to the connector to release the connector from at least one of the instrument panel and the base.

The assembly may further include a pyrotechnic actuator engaged with the connector.

The base may include a hole and the connector may be a pin disposed in the hole in the front position.

The assembly may further include a stop on the instrument panel positioned to engage the hole in the stowed position.

The stop may be a pin spring-biased toward the base in the front position.

The assembly may further include an actuator engaged with the connector and a controller programmed to actuate the actuator in response to detection of an impact.

The base may be rotatable relative to the instrument panel about a generally upward axis.

The assembly may further include a bearing between the base and the instrument panel.

The assembly may further include an airbag inflatable to an inflated position, wherein the interior component may move away from the airbag from the front position to the stowed position as the airbag inflates to the inflated position.

The airbag may be supported by the instrument panel.

The assembly may further include a hinge, and the base may be rotatable about the hinge.

The hinge and the spring may be rotatable about a common axis.

The base may include a housing, and the housing and the instrument panel may present a class-A surface when the base is in the front position.

The base may be rotatable about a generally horizontal axis.

The spring may be designed to move the base from the front position to the stowed position when the spring is deployed from an undeployed position to a deployed position.

The assembly may further include a stop between the instrument panel and the base, the stop positioned to stop the base in the stowed position when the base moves from the front position to the stowed position.

The stop may be a pin on one of the base and the instrument panel and spring-loaded toward the other of the base and the instrument panel.

With reference to the Figures, wherein like numerals indicate like parts throughout the several views, an assembly 10, 12 in a vehicle 14 includes an instrument panel 16, a base 18, 20 rotatably mounted to the instrument panel 16 between a front position and a stowed position, a spring 22 biasing the base 18, 20 toward the stowed position, and an interior component 24 supported by the base 18, 20.

Since the base 18, 20 is rotatably mounted to the instrument panel 16, the base 18, 20 may be rotated to the stowed position during inflation of an airbag 26 (e.g., during a vehicle impact) to reduce or eliminate interaction between the airbag 26 and the interior component 24. Specifically, the base 18, 20 positions the interior component 24 farther from the airbag 26 (when inflated) when the base 18, 20 moves from the front position to the stowed position.

The assembly 10, 12 includes the instrument panel 16, as shown in FIGS. 1-8. The instrument panel 16 may be disposed at a forward end of a passenger cabin and face toward front seats. The instrument panel 16 may include vehicle controls, HVAC components, and/or infotainment screens. The instrument panel 16 may support a steering wheel. An upward axis A about which the base 18, 20 rotates from the front position to the stowed position extends from the instrument panel 16. The upward axis A may be generally vertical. Specifically, the upward axis A extends from a top surface of the instrument panel. The top surface of the instrument panel 16 may extend substantially in a plane P and, in such an example, the upward axis A extends upwardly transverse to the plane P. As one example, the upward axis A may be normal to the plane P. In one example in which the axis A is normal to the plane P, the plane P may be generally horizontal and the upward axis A may be generally vertical.

The vehicle 14 includes at least one airbag 26. The airbag 26 may be supported by the instrument panel 16 and may inflate away from the instrument panel 16 into the passenger compartment and toward vehicle occupants. The airbag 26 may be directly supported by the instrument panel 16, e.g., a passenger airbag, or may be directly supported by a steering wheel, e.g., a driver airbag. In the examples shown in the Figures, the vehicle 14 includes two airbags (specifically a passenger airbag and a driver airbag), however, the vehicle 14 may include any suitable number of airbags 26, any of which inflate toward position of the interior component 24 in the front position. Such airbag(s) 26 may be supported by the instrument panel 16 or any other suitable component, e.g., a roof, center console, seat, etc.

Figure 7:
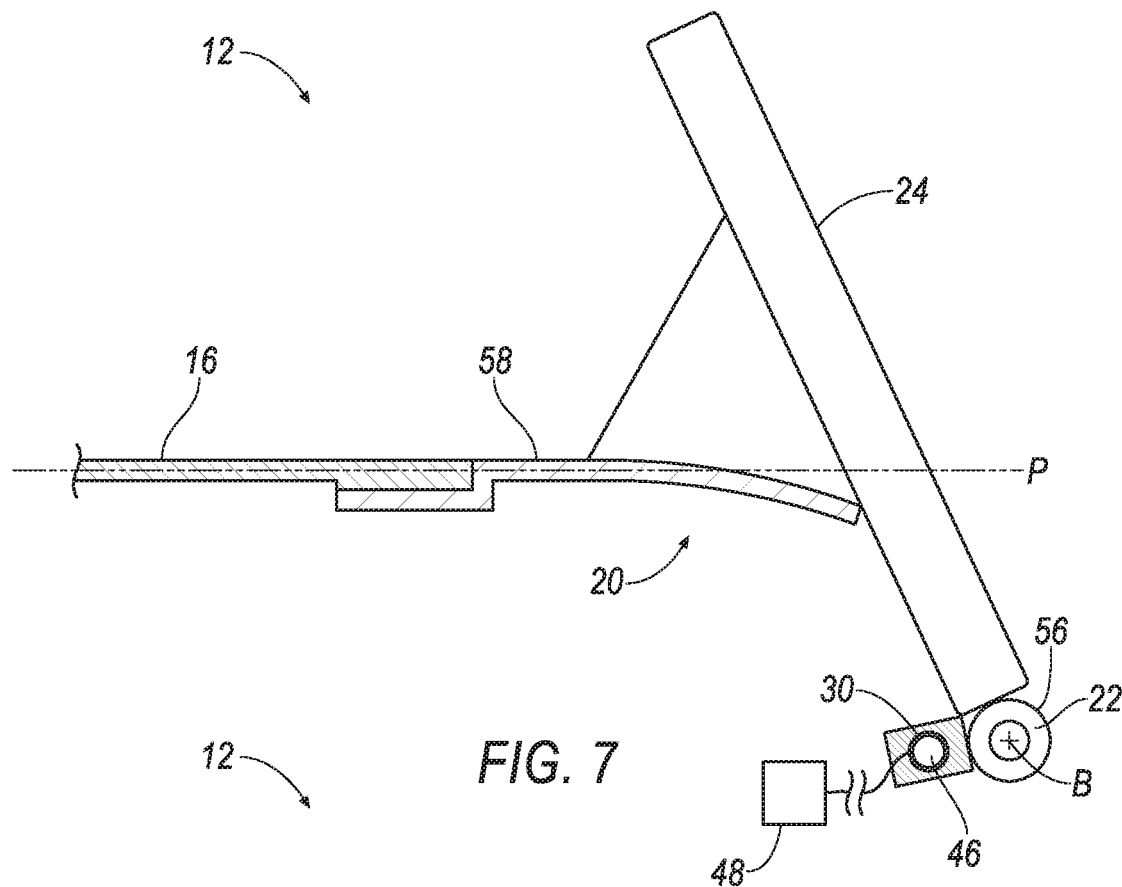
FIG. 7 is a side view of the instrument panel and the second display in a front position.
Figure 8:
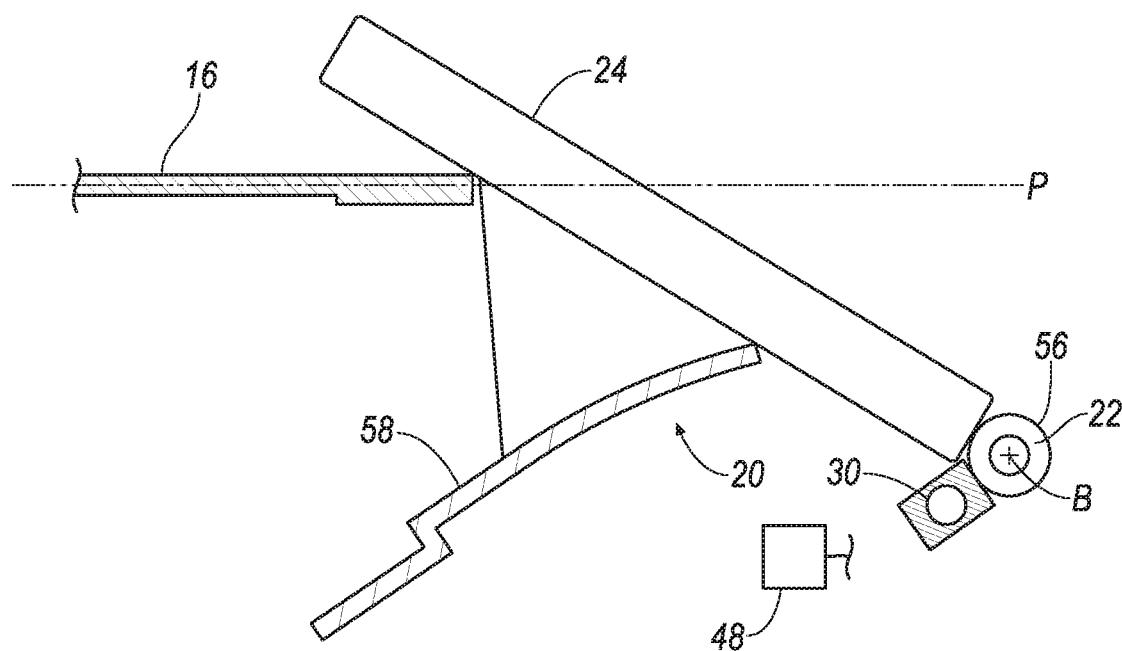
FIG. 8 is a side view of the instrument panel and the second display in a stowed position.

The assembly 10, 12 includes the base 18, 20. One embodiment of the assembly 10 is shown in FIGS. 1-5 and another embodiment of the assembly 12 is shown in FIGS. 7-8. The assembly 10 includes the base 18, as shown in FIGS. 1-5, and the assembly 12 includes the base 20, as shown in FIGS. 7-8.

Figure 2:
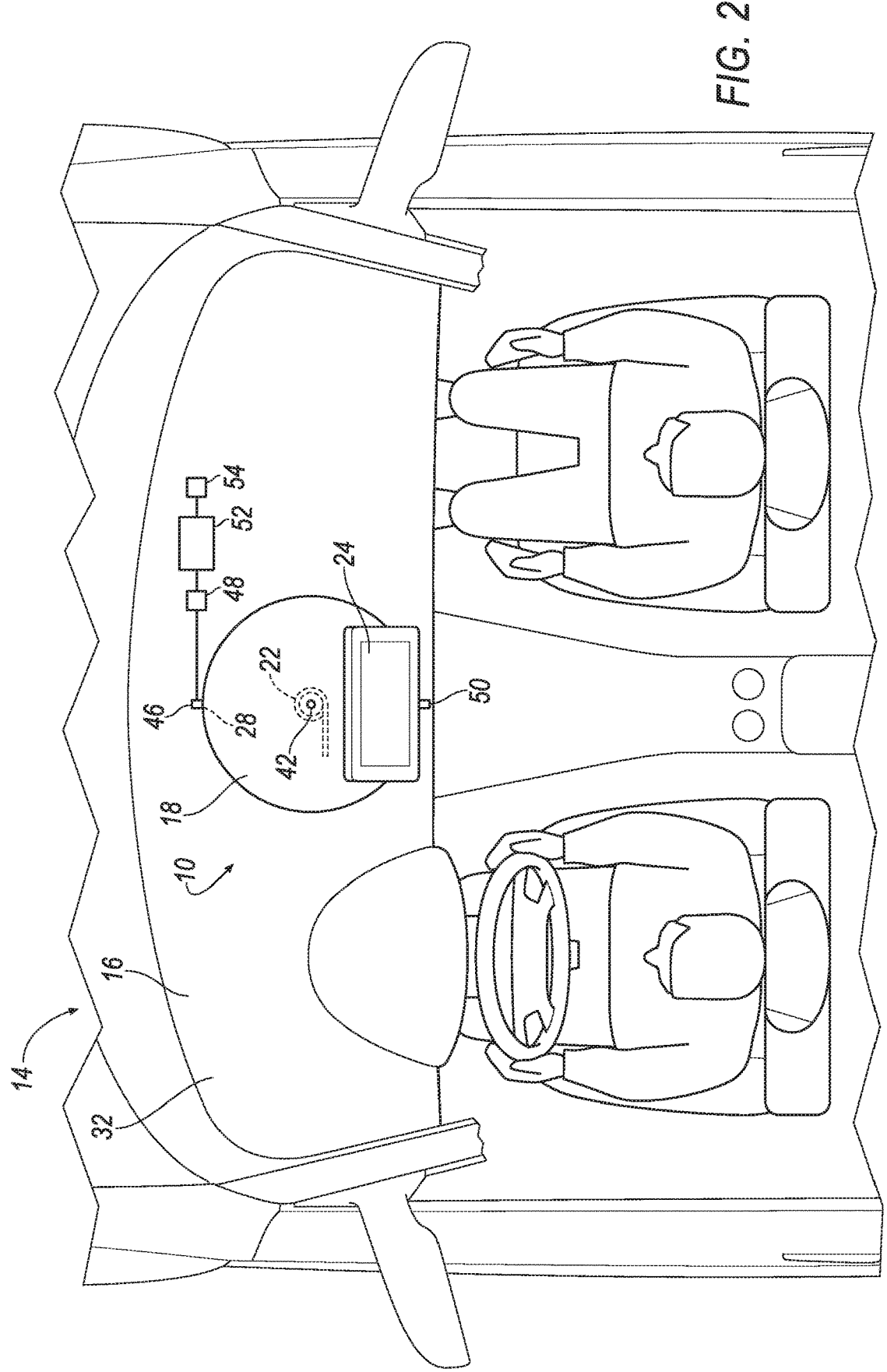
FIG. 2 is a plan view of the instrument panel and the display in a front position.
Figure 3:
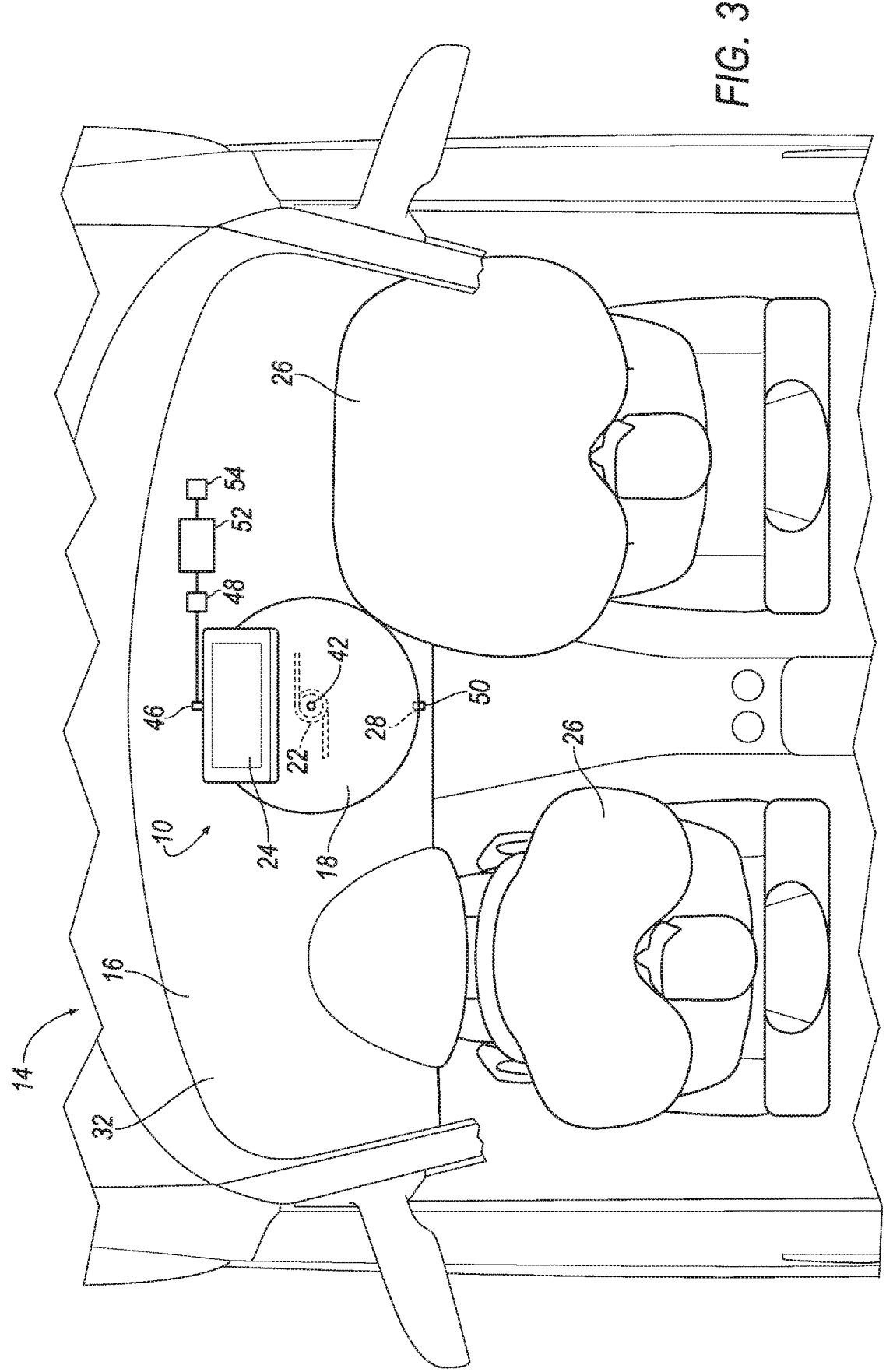
FIG. 3 is a plan view of the instrument panel and the display in a stowed position.
Figure 4:
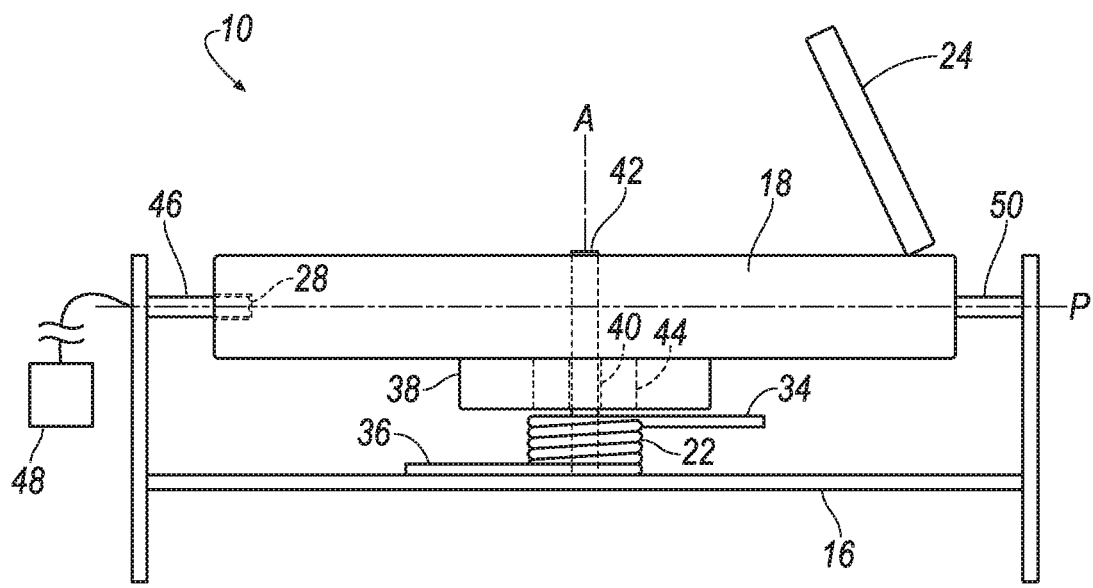
FIG. 4 is a side view of the display.
Figure 5:
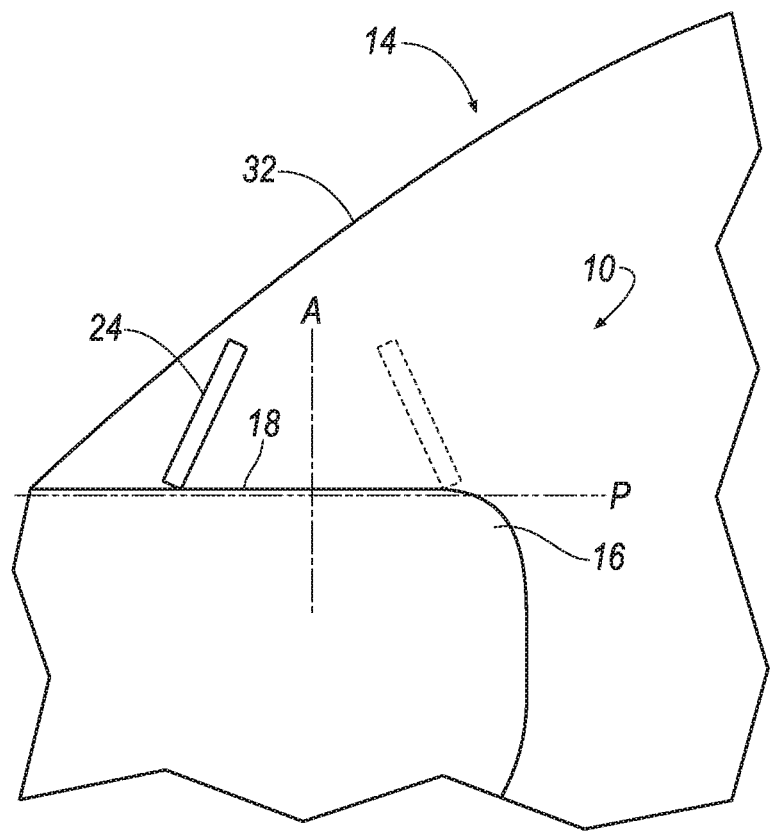
FIG. 5 is a side view of the instrument panel.
Figure 6:
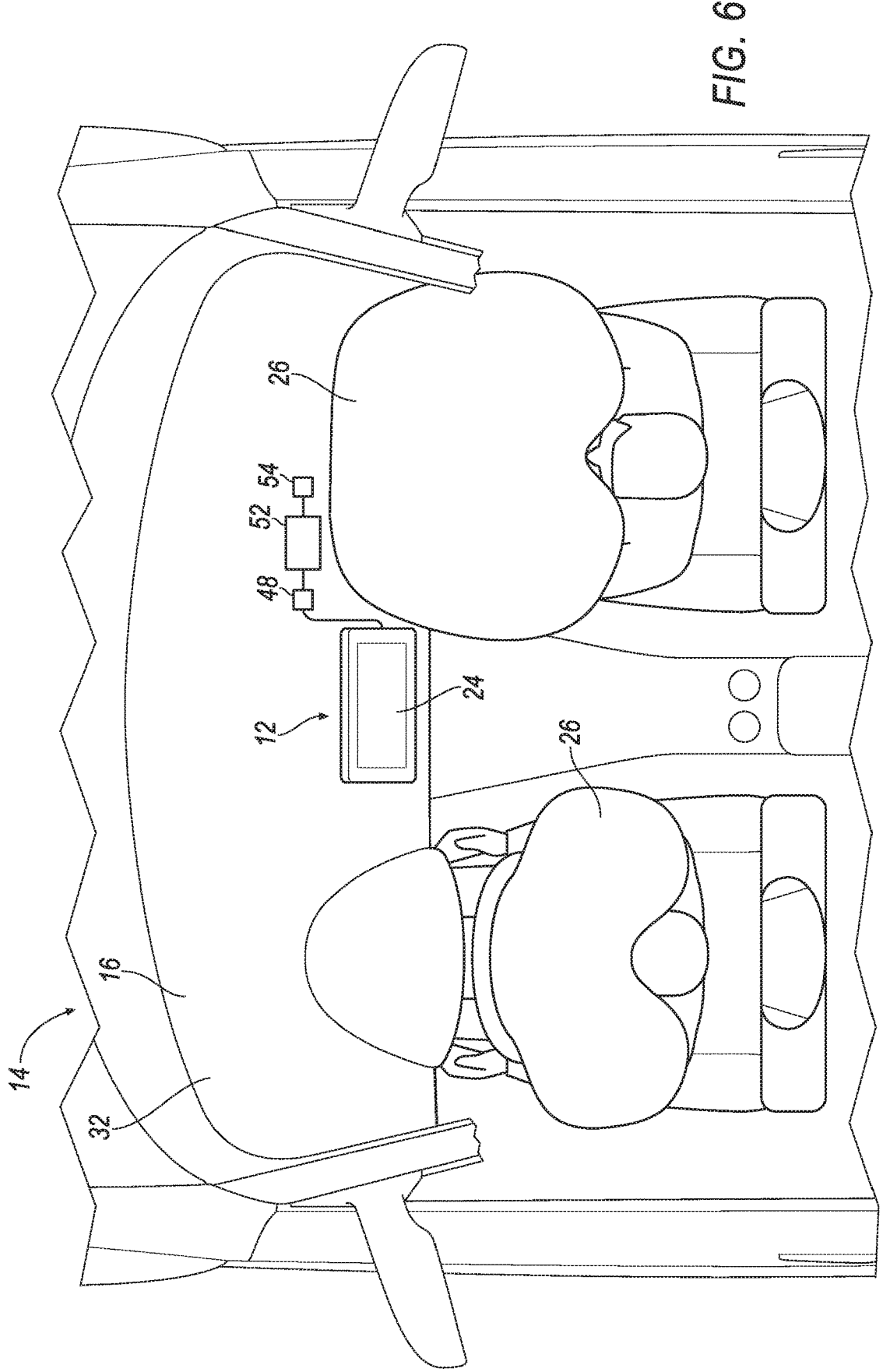
FIG. 6 is a plan view of the instrument panel and a second interior component that is a second display.

The base 18, 20 is rotatably mounted to the instrument panel 16, i.e., the base 18, 20 is rotatable relative to the instrument panel 16 from the front position (FIGS. 1, 2, 7) to the stowed position (FIGS. 3 and 8). The base 18 may rotate about the upward axis A, as shown in FIGS. 4-5. As another example, as shown in FIGS. 6-8, the base 20 may rotate about a generally horizontal axis B. The axis B may extend in a vehicle-crosswise direction, i.e., a direction transverse to (e.g., perpendicular to) forward motion of the vehicle 14.

The base 18, 20 rotates between the front position and the stowed position. In the front position, the base 18, 20 faces the interior component 24 to occupants in the passenger cabin. In the stowed position, the base 18, 20 faces the interior component 24 away from the occupants. During vehicle impact, the base 18, 20 rotates from the front position to the stowed position to move the interior component 24 away from the occupants and/or the airbag 26.

The assembly 10, 12 includes the interior component 24. The interior component 24 faces occupants in the passenger cabin of the vehicle 14. The interior component 24 may be any suitable component that faces the occupants. For example, the interior component 24 may be an HVAC duct that blows air onto the occupants. In another example, the interior component 24 may be a platform for physical and/or analog controls, e.g., to control a climate system, an infotainment system, etc. In another example, the interior component may be a display screen 24. The base 18, 20 moves the interior component 24 from the front position facing the occupants to the stowed position away from the occupants.

As described above and shown in the Figures, the interior component 24 may be a display screen 24. The display screen 24 is supported by the base 18, 20. The display screen 24 may be a human-machine interface ("HMI") screen that displays messages and images to the users in the passenger cabin. For example, the display screen may be an LCD display, and LED display, a plasma display, etc.

During vehicle impact, when the base 18, 20 is in the stowed position, the display screen 24 faces away from the occupants in the passenger cabin. For example, as shown in FIGS. 3, 5, the display screen 24 may rotate about the upward axis A toward a windshield 32 in the stowed position. In another example, as shown in FIGS. 6, 8, the display screen 24 may rotate about the horizontal axis B toward the instrument panel 16 in the stowed position.

With reference to FIGS. 3-4 and 7-8, the assembly 10, 12 includes the spring 22. The spring 22 is designed to move the base 18, 20 from the front position to the stowed position when the spring 22 is deployed from an undeployed position to a deployed position. The spring 22 biases the base 18, 20 toward the stowed position. That is, when the base 18, 20 is in the front position, the spring 22 is loaded and exerts a force against the base 18 toward the stowed position. As set forth below, the base 18 is held in the front position against the bias of the spring 22. When the base 18 is released, the spring 22 unloads to rotate the base 18, 20 to the stowed position.

The spring 22 may be a torsion spring. In such an example, as shown in FIG. 4, the spring 22 may have a first end 34 connected to the base 18 and a second end 36 connected to the instrument panel 16 and may be loaded by relative rotation of the first end 34 and the second end 36. As another example, the spring may be a coil spring.

The assembly 10 may include a bearing 38, as shown in FIG. 4. The bearing 38 may be disposed between the base 18 and the instrument panel 16. As shown in FIG. 4, the bearing 38 may be connected to the base 18 and to the spring 22. For example, the bearing 38 may be disposed along the upward axis A between the base 18 and the spring 22 to facilitate rotation of the base 18 caused by the spring 22. The bearing 38 may have an inner race 40 fixed to a rotation post 42 and an outer race 44 mounted to the base 18 and to the spring 22. Upon deployment of the spring 22, the spring 22 may rotate the outer race 44 of the bearing 38, rotating the base 18 about the upward axis A. The rotation post 42 restricts movement of the base 18 away from the upward axis A and remains stationary while the base 18 rotates about the rotation post 42. That is, the bearing 38 allows rotation of the base 18 relative to the rotation post 42 about the upward axis A to the stowed position. The bearing 38 may be any suitable type, e.g., a ball bearing, a roller bearing, etc. Alternatively, the assembly 10 may lack the bearing 38, and the spring 22 may be directed mounted to the base 18.

The assembly 10, 12 may include a connector 46, as shown in FIGS. 2-4, 7. The connector 46 releasably secures the base 18, 20 in the front position by preventing the spring 22 from unloading and rotating the base 18, 20 to the stowed position. The connector 46 may be releasably engaged with the instrument panel 16 and the base 18, 20 in the front position against the bias of the spring 22. That is, the connector 46 prevents the spring 22 from biasing the base 18, 20 to the stowed position and the connector 46 may be released to allow the spring 22 to bias the base 18, 20 to the stowed position.

The connector 46 may be, e.g., a pin, a slat, a dowel, etc. As one example, the base 18, 20 may define a hole 28, 30 (hole 28 shown in FIGS. 2-4 and hole 30 shown in FIGS. 7-8) and the connector 46 is disposed in the hole 28, 30. When the connector 46 disengages the hole 28, 30, the base 18, 20 is free to rotate relative to the instrument panel 16 and the spring 22 unloads and rotates the base 18, 20 to the stowed position.

The assembly 10, 12 may include an actuator 48, as shown in FIGS. 2-4 and 6-8. The actuator 48 may be operatively connected to the connector 46. That is, the actuator 48 may be connected to the connector 46 such that the actuator 48 may release the connector 46 from at least one of the base 18, 20 and the instrument panel 16. Upon removal of the connector 46 from the base 18, 20, the spring 22 rotates the base 18, 20 to the stowed position. In the examples in which the connector 46 is disposed in the hole 28, 30, the actuator 48 may remove the connector 46, e.g., in the form of a pin, from the hole 28, 30.

The actuator 48 may be a pyrotechnic actuator 48 engaged with the connector 46. The pyrotechnic actuator 48 may include combustible to produce a gas. The pyrotechnic actuator 48 may have a solid mixture of substances that, when ignited, react to produce the gas. For example, the pyrotechnic actuator 48 may include sodium azide (NaNO3), potassium nitrate (KNO3), and silicon dioxide (SiO2), which react to form nitrogen gas (N2). The ignition of the pyrotechnic actuator 48 may push the connector 46 away from the base 18, 20 to allow the spring 22 to bias the base 18, 20 to the stowed position. In the examples in which the connector 46 is disposed in the hole 28, 30, the pyrotechnic actuator 48 may push the connector 46, e.g., in the form of a pin, from the hole 28, 30. As other examples, the actuator 48 may be any suitable type, e.g., electromagnetic, pneumatic, hydraulic, etc.

The assembly 10 may include a stop 50, as shown in FIGS. 2-4. The stop 50 is positioned to stop the base 18 in the stowed position when the base 18 moves from the front position to the stowed position. In the examples in which the connector 46 is disposed in the hole 28, 30, to stop the base 18, the stop 50 may engage the hole 28 in the base 18 in the stowed position. That is, when the base 18 rotates to the stowed position, the stop 50 may enter the hole 28, stopping rotation of the base 18. The stop 50 may be disposed on one of the base 18 and the instrument panel 16. The stop 50 may be spring-loaded, i.e., spring-biased, toward the other of the base 18 and the instrument panel 16. For example, the stop 50 may be spring-loaded from the instrument panel 16 toward the base 18 to engage the hole 28 when the base 18 moves to the stowed position. That is, the stop 50 may contact the base 18 when the base 18 is in the front position and may maintain contact with the base 18 during rotation to the stowed position. When the base 18 rotates to the stowed position, the hole 28 may align with the stop 50, and the stop 50 may enter the hole 28, stopping rotation of the base 18 and securing the base 18 based in the stowed position. The stop 50 maybe, e.g., a pin, a slat, a dowel, etc. Alternatively, the assembly 10 may lack the stop 50 and the spring 22 may be tuned (i.e., selected and/or sized with a specific spring constant) to stop rotation of the base 18 in the stowed position.

The assembly 10, 12 may include a controller 52 and an impact sensor 54, as shown in FIGS. 2-3, 6. The controller 52 may be programmed to actuate the actuator 48 in response to detection of an impact based on data from the impact sensor 54. The controller 52 includes a processor and a memory. The controller 52 receives data from the impact sensor 54 that is stored in the memory. The processor executes instructions stored in the memory to process the data and to detect the vehicle impact. For example, the controller 52 may receive acceleration data from the impact sensor 54 and when the acceleration data exceeds a predetermined threshold, the controller 52 may determine that the vehicle impact is occurring. Upon detecting the vehicle impact, the controller 52 may actuate the actuator 48 to move the base 18, 20 to the stowed position. For example, the controller 52 may actuate the pyrotechnic actuator 48 to release the connector 46, allowing the spring 22 to unload and rotate the base 18, 20to the stowed position. The controller 52 may communicate with the actuator 48 and the impact sensor 54 over, e.g., a communications bus, a vehicle wireless network, wires, etc.

The assembly 12 may include a hinge 56, as shown in FIGS. 7-8. The base 20 may be rotatable about the hinge 56. The hinge 56 and the spring 22 may be rotatable about a common axis, e.g., the horizontal axis B. Upon actuation of the actuator 48 and removal of the connector 46, the spring 22 unloads, rotating the base 20 about the hinge 56 from the front position shown in FIG. 7 to the stowed position shown in FIG. 8. The hinge 56 may be supported by the instrument panel 16.

The base 20 may include a housing 58, as shown in FIGS. 7-8. The housing 58 supports the display screen 24. The housing 58 and the display screen 24 may be fixed relative to each other to move together as a unit from the front position the stowed position. The housing 58 may be substantially flush with the instrument panel 16 when the base 20 is in the front position. That is, the housing 58 and the instrument panel 16 may be substantially aligned with the plane P and may present a class-A surface when the base 20 is in the front position. When the base 20 is in the stowed position, the housing 58 may extend below a portion of the instrument panel 16. When the housing 58 extends below the instrument panel 16, the display screen 24 moves away from users in the passenger cabin.

During a vehicle impact, the display screen 24 may move away from the airbag 26 from the front position to the stowed position as the airbag 26 inflates to the inflated position. When the base 18, 20 is in the stowed position, the display screen 24 is spaced from the airbags 26, allowing the airbags 26 to inflate into the passenger cabin of the vehicle 14. For example, as shown in FIG. 3, when the base 18 rotates about the upward axis A to the stowed position, the display screen 24 is moved toward the windshield 32 and spaced from the airbags 26. In another example, as shown in FIG. 6, when the base 20 rotates about the horizontal axis B, the housing 58 extends beneath the surface of the instrument panel 16, moving the display screen 24 away from the airbags 26. Thus, by rotating the display screen 24 away from the airbags 26, the airbags 26 may receive the occupants during the vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
    an instrument panel;
    a base rotatably mounted to the instrument panel, the base being rotatable relative to the instrument panel about a rotational axis through the base between a front position and a stowed position;
    a spring biasing the base toward the stowed position;
    an interior component supported by the base spaced from the rotational axis, the interior component being rotatable with the base about the rotational axis from the front position to the stowed position;
    a connector releasably engaged with the instrument panel and the base in the front position against the bias of the spring;
    the base including a hole and the connector being a pin disposed in the hole in the front position; and
    a stop between the instrument panel and the base, the stop positioned to stop the base in the stowed position when the base moves from the front position to the stowed position;
    the stop being a second pin on one of the base and the instrument panel and spring-loaded toward the other of the base and the instrument panel.

2. The assembly as set forth in claim 1, wherein the interior component is a display screen.

3. The assembly as set forth in claim 1, further comprising an actuator operatively connected to the connector to release the connector from at least one of the instrument panel and the base.

4. The assembly as set forth in claim 1, further comprising a pyrotechnic actuator engaged with the connector.

5. The assembly as set forth in claim 1, further comprising an actuator engaged with the connector and a controller programmed to actuate the actuator in response to detection of an impact.

6. The assembly as set forth in claim 1, wherein the base is rotatable relative to the instrument panel about a generally upward axis.

7. The assembly as set forth in claim 1, further comprising a bearing between the base and the instrument panel.

8. The assembly as set forth in claim 1, further comprising an airbag inflatable to an inflated position, wherein the interior component moves away from the airbag from the front position to the stowed position as the airbag inflates to the inflated position.

9. The assembly as set forth in claim 8, wherein the airbag is supported by the instrument panel.

10. The assembly as set forth in claim 1, wherein the spring is designed to move the base from the front position to the stowed position when the spring is deployed from an undeployed position to a deployed position.

11. An assembly, comprising:
a display screen;
a base rotatably mounted to the instrument panel, the base being rotatable relative to the instrument panel about a rotational axis through the base between a front position and a stowed position;
a spring biasing the base toward the stowed position;
an interior component supported by the base spaced from the rotational axis, the interior component being rotatable with the base about the rotational axis from the front position to the stowed position;
a connector releasably engaged with the instrument panel and the base in the front position against the bias of the spring;
the base including a hole and the connector being a pin disposed in the hole in the front position;
an actuator operatively connected to the connector to release the connector from at least one of the instrument panel and the base;
an airbag inflatable to an inflated position, the display screen moving away from the airbag from the front position to the stowed position as the airbag inflates to the inflated position; and
a second pin, the second pin being on the instrument panel and positioned to engage the hole in the stowed position, the second pin being spring-biased toward the base in the front position.

12. An assembly, comprising:
an instrument panel;
a base rotatably mounted to the instrument panel between a front position and a stowed position;
a spring biasing the base toward the stowed position;
an interior component supported by the base;
a connector releasably engaged with the instrument panel and the base in the front position against the bias of the spring;
the base including a hole and the connector being a pin disposed in the hole in the front position; and
a stop on the instrument panel positioned to engage the hole in the stowed position;
the stop is a second pin spring-biased toward the base in the front position.

13. The assembly as set forth in claim 12, wherein the base is rotatable relative to the instrument panel about a generally upward axis.

\* \* \* \* \*